US008574032B2

(12) United States Patent
Norville

(10) Patent No.: US 8,574,032 B2
(45) Date of Patent: Nov. 5, 2013

(54) UV PROTECTIVE COATING COMPOSITION AND METHOD

(75) Inventor: William C. Norville, San Diego, CA (US)

(73) Assignee: PCW Holdings, LLC, Las Vegas, NV (US)

( * ) Notice: Subject to any disclaimer, the term of this patent is extended or adjusted under 35 U.S.C. 154(b) by 337 days.

(21) Appl. No.: 13/069,225

(22) Filed: Mar. 22, 2011

(65) Prior Publication Data

US 2012/0244786 A1 Sep. 27, 2012

(51) Int. Cl.
*B24B 7/30* (2006.01)
*B05D 3/00* (2006.01)

(52) U.S. Cl.
USPC ........................ 451/54; 427/140; 427/163.1

(58) Field of Classification Search
CPC .......... B24B 37/044; C09G 1/00; C09G 1/02; C09G 1/04; C09K 3/1454; C09K 3/1463
USPC ............... 451/57, 59; 264/36.1, 1.1; 427/140, 427/161, 162, 163.1, 299, 314, 315, 322, 427/402; 438/695, 697; 252/79.1–79.5; 216/24, 26, 38, 52–53, 88–89; 106/3
IPC ................................................ B24B 1/00, 29/02
See application file for complete search history.

(56) References Cited

U.S. PATENT DOCUMENTS

| 4,301,193 | A | * | 11/1981 | Zuk ................................ 427/140 |
| 5,039,311 | A |   | 8/1991  | Bloecher |
| 5,194,293 | A | * | 3/1993  | Foster ............................ 427/512 |
| 5,248,521 | A | * | 9/1993  | Yamane et al. ................ 427/140 |
| 5,334,335 | A | * | 8/1994  | Norville ........................ 264/36.1 |
| 5,337,524 | A |   | 8/1994  | Norville |
| 5,407,615 | A | * | 4/1995  | Norville ........................ 264/36.1 |
| 5,443,604 | A | * | 8/1995  | Stowell ............................ 51/307 |
| 5,913,716 | A |   | 6/1999  | Mucci |

(Continued)

FOREIGN PATENT DOCUMENTS

| EP | 0650803 | 5/1995 |
| JP | 2002050215 | 2/2002 |
| WO | WO 2004032835 A2 * | 4/2004 |

OTHER PUBLICATIONS

Whitney, T., Characterization of Clearfix Process for Stretched Acrylic, University of Dayton Research Institute, Nov. 1, 1995.

(Continued)

*Primary Examiner* — Joseph J Hail
*Assistant Examiner* — Marc Carlson
(74) *Attorney, Agent, or Firm* — Workman Nydegger

(57) ABSTRACT

Plastic restoration kits and methods for restoring the light transmission and optical clarity properties of plastic surfaces, such as plastic aircraft windows, automobile plastic headlight covers, plastic sunglass lenses, and plastic corrective optical lenses. The kits and methods restore plastic surfaces that have been damaged by hazing, scratching and/or UV-induced oxidation. The kits and methods employ at least one polishing composition configured to improve clarity by removing scratches. A UV protective material is incorporated into at least one of the polishing compositions so that the UV protective material becomes worked into the plastic surface during polishing, and a protective coating that forms a hard protective coating over the plastic surface impregnated with the UV protective material is finally applied. The plastic surface may be heated after polishing and prior to application of the protective coating material.

25 Claims, 4 Drawing Sheets

(56) References Cited

U.S. PATENT DOCUMENTS

| | | | |
|---|---|---|---|
| 6,685,691 B1 * | 2/2004 | Freund et al. | 604/403 |
| 6,835,120 B1 | 12/2004 | Matsui | |
| 6,984,612 B2 * | 1/2006 | Maillie | 510/163 |
| 7,045,001 B1 * | 5/2006 | Kropp et al. | 106/3 |
| 7,163,446 B1 * | 1/2007 | Cole et al. | 451/54 |
| 7,404,988 B2 * | 7/2008 | Kuta | 427/508 |
| 7,793,786 B2 * | 9/2010 | Shadwell | 206/582 |
| 2002/0090891 A1 | 7/2002 | Adefris | |
| 2003/0173551 A1 * | 9/2003 | Nagpal | 252/582 |
| 2005/0159325 A1 | 7/2005 | Maillie | |
| 2005/0208210 A1 | 9/2005 | Kuta | |
| 2006/0201605 A1 | 9/2006 | Shadwell | |
| 2008/0259617 A1 * | 10/2008 | Torcivia et al. | 362/459 |
| 2009/0098806 A1 | 4/2009 | Lobmeyer | |
| 2009/0148606 A1 * | 6/2009 | Norville | 427/307 |
| 2010/0154208 A1 * | 6/2010 | Torcivia | 29/700 |
| 2011/0189386 A1 * | 8/2011 | Norville | 427/140 |
| 2012/0094579 A1 * | 4/2012 | Starling | 451/28 |
| 2012/0097194 A1 * | 4/2012 | McDaniel et al. | 134/26 |

OTHER PUBLICATIONS

U.S. Appl. No. 11/952,831, Dec. 22, 2010, Office Action.
U.S. Appl. No. 11/952,831, Apr. 12, 2011, Office Action.

\* cited by examiner

UV PROTECTIVE COATING COMPOSITION AND METHOD

BACKGROUND OF THE INVENTION

1. The Field of the Invention

The present invention is directed to restoring clarity and optics to plastic surfaces (e.g., aircraft windows). In particular, the present invention is directed to compositions and methods for removing scratches and oxidative damage from plastic surfaces including plastic aircraft windows, plastic covers (e.g., headlight covers), lenses, optical lenses, sighting mechanisms, and other plastic surfaces. Embodiments of the invention further have the ability to prevent future damage due to hazing, scratching and oxidation so as to extend the life expectancy of such surfaces.

2. The Relevant Technology

Plastic materials have largely replaced glass as an optically transparent and safe covering for most all aircraft windows and canopies due to their light weight, strength, and because the window may comprise a molded polycarbonate plastic that is formed into an aerodynamic shape that fits the profile of the aircraft opening at a fraction of the weight of its glass counterpart. Such plastic materials have also replaced other objects that were once formed of glass. For example, headlight covers of typical late model vehicles are also formed of plastic (e.g., polycarbonate), rather than glass. A typical plastic headlight cover is composed of a molded polycarbonate plastic that is formed into an aerodynamic shape that fits the profile of the front of the automobile.

Plastics are superior to glass in a number of respects. Plastics are lighter than glass while having similar clarity, they are more flexible and able to absorb small impacts, and they are much less likely to shatter in response to large impacts. In addition, plastics can readily be molded into a variety of aerodynamic shapes that are more compatible with modern aircraft and automotive design.

Plastics, however, present a number of disadvantages. For example, they are prone to scratching, hazing, and UV-induced oxidative damage. And while plastic aircraft windows and headlight covers are typically endowed with coatings that protect against scratching and UV damage, such coatings do not provide 100% protection over time. For example, airborne particles, road particles, and other hard, abrasive substances can penetrate the protective coating and cause scratching that degrades the optical properties of the plastic. In addition to physically degrading the optical properties of the plastic surface, scratching leads to a number of other processes that can damage the plastic. For example, scratches (from washing and cleaning the surface) that penetrate the protective coating can allow access to the plastic substrate by exhaust emissions and the chemicals in acid rain. Similarly, scratches of the protective coating on an aircraft window within a pressurized aircraft also allow access to the plastic substrate. In addition, heating of the windows or headlight cover by the sun or by high intensity headlights can cause hazing and scratches to expand and contract, allowing greater access to the plastic substrate for UV radiation, oxygen, and other environmental constituents. Over time, if these processes are left unchecked, plastic aircraft windows as well as headlight covers and other plastic surfaces can become hazy, almost opaque, reducing the clarity and optical quality of the window. In the case of headlights, the lumens, or light output transmitted through the plastic headlight cover can be greatly reduced. This naturally creates safety issues due to reduced optical clarity. For example, when flying into the sun the ability to see effectively through such windows can be greatly diminished, creating a safety issue for aircraft pilots and passengers. In the case of automobiles, reduced headlight intensity can result in an inability to effectively see the road ahead and an inability to be seen by others. For example, an object or person on an unlit road may only be seen at about 50 feet, rather than the over 200 feet that would be typical with a new headlight cover, which makes it difficult to brake in time. In addition, such damaged headlight covers diffuse the light output from the headlight, causing diffused glare to oncoming drivers.

Replacement is one option for aircraft owners, but the cost of such aircraft windows can run anywhere from $1,000 to $75,000 per window, which does not account for labor and aircraft down time. Such incidental costs for the military and airlines can be even more significant than the price of the window. Similarly, headlight covers that have been badly damaged by hazing, scratching and/or oxidation can be replaced, but at relatively high cost. Replacing the plastic covers can be cost prohibitive for many consumers. For example, the typical cost for replacing headlight covers on a car can run anywhere between $300 to $1,500 per headlight, not including installation costs.

There are products that are available that purport to restore plastic surfaces. Most of these products, however, use sand paper, harsh cleaners or processes, cheap waxes, and metal polish intended for other applications. These products can be very detrimental to the fragile clarity and optics of the plastic surfaces. Also, whatever benefit is derived from these products is often short lived, as the uncoated plastic surface will quickly become crazed when again exposed to environmental forces.

One example of a product that has been used to remove scratches from plastics, including aircraft windows, is a system called MICRO-MESH. Another is available from 3M. Both of these use different varieties of PERMATEX, which uses sand paper or sanding discs. The MICRO-MESH and the 3M systems both remove scratches from plastics using a series of rubber-backed sanding cloths or discs with differing sizes of grit. The first series of MICRO-MESH steps uses a rubber backed sanding cloth having 8 different grits starting at 2,400 grit. In subsequent steps, sanding cloths of finer gauge up to 12,000 gauge grit are used. In addition to using the rubber sanding block, a small amount of antistatic cream is applied after polishing is complete. The 3M system uses sanding discs applied with an air tool. The main problem with these systems is that they both require a very skilled technician to perform the procedure properly.

Such systems have many negative aspects. One negative aspect is that without a skilled technician, the process results in optical distortions because a large amount of plastic must be sanded away in order to remove even the tiniest of scratches. That is, it is necessary to remove enough of the plastic surface to at least equal the depth of the scratch in an even pattern up, down, and side-to-side, known as "cross-hatching". Once this is done, the optics and clarity of the plastic must be restored, although a major problem is that whenever a sizable area of plastic is removed, a much larger portion of the window surrounding the scratch must be polished out in order to avoid causing optical distortion of the plastic in the surrounding area where the scratch was removed. To avoid optical distortion, the user must possess a high level of skill and patience, which requires a high amount of training. Such a high level of training is a practical impossibility with a constant turnover of personnel (e.g., as in the military).

Moreover, repeated scratch removals using this system will greatly reduce the thickness of the plastic and destroy its desired protective properties. In addition, in the case of pressurized aircraft, there are minimum thickness requirements for airworthiness. One or perhaps two of these sandings may be sufficient to render the window too thin to meet the standard. Another negative aspect of existing sanding systems is the large amount of time it takes to perform each of the series of sandings for each type of grit. Yet another negative aspect of such sanding systems is that extensive sanding removes any protective UV or other specialty coating from the plastic along with the scratches they were intended to remove. Many plastic windows and lenses include such specialty coatings.

With respect to aircraft windows, the two systems previously mentioned, as well as another available system known as the Plastec EZ Clear system use an oil based polishing compound to finish the process. Because the polish includes oil, it results in a plastic surface that appears clear and scratch free, but once the window is washed once or twice with soap and water the oil residue is lost, and the scratches and hazing from the grit of the polishing compounds become visible again.

With respect to headlight cover repair systems, many other products use varnishes or clear coatings, such as acrylic spar varnish, to essentially fill in and cover scratches in the plastic head light cover. These products are easy and quick to use, but they ultimately do not restore the plastic. A coat of varnish merely covers the scratching and oxidation and does nothing to repair the underlying damage to the plastic. Varnishes and paint generally do not adhere to plastic very well and the varnish is likely to flake off in a short period of time. Moreover, if the refractive index of the varnish coating is dissimilar to that of the underling plastic, each of the filled in scratches will act as a micro lens scattering the light from the headlight. Such a result diffuses the light output so that no real improvement in the problem is achieved. While the headlight may look better after applying the coat of varnish, the varnish will not in fact restore the clarity or optical properties of the cover.

Scratching and oxidation damage to various types of plastic surfaces presents an ongoing problem. In the case of plastic aircraft windows, such damage presents an important safety hazard to pilots and other crew of emergency and military aircraft, and while it may simply be thought of as annoying to passengers on commercial aircraft, a need exists for systems and methods for better restoring such plastic surfaces.

BRIEF SUMMARY OF THE INVENTION

The present invention is directed to compositions and methods for restoring the clarity, optics, and light transmission properties of any plastic surface that has been damaged by hazing, scratching, environmental exposure, and/or ultraviolet induced oxidation. A kit including treating compositions includes at least one polishing composition configured to remove scratches from a plastic surface, and a protective coating composition that forms a hard protective coating over the restored surface once polished with the at least one polishing composition. Advantageously, a UV protective material is included within at least one of the polishing compositions so that during polishing, the UV protective material is worked into the plastic surface as a result of frictional heat generated during polishing, after which the protective coating is applied.

The UV protective material to be deposited and worked into the substrate level of the plastic surface being polished provides an anchor below the exterior surface of the plastic (e.g., about 30 microns deep). After the UV protective material is worked into the plastic substrate, the plastic surface may be heated (e.g., to between about 110° F. and about 160° F.) with a heat gun, causing the plastic to expand. At this point, the catalyzed protective UV coating package is opened and applied to the applicator and then the plastic surface. When applied, the coating is absorbed into the substrate (e.g., about 30 microns below the exterior surface). The plastic surface may be heated again, causing the protective coating to harden.

A polymerizable material may also be included within at least one of the polishing compositions with the UV protective material to better provide an anchoring system through which the protective coating composition is better able to bond to the plastic surface. The treatment results in improvement to the clarity and optical characteristics of the plastic surface, while also restoring UV protection to the surface. In one embodiment, each composition may be packaged separately in a substantially oxygen free environment (e.g., under inert nitrogen).

In a related method for restoring optical clarity and light transmission properties to the plastic surface, the plastic surface is polished with at least one polishing composition with a buffing pad or buffing cloth. The polishing compositions include polishing abrasives that are configured to improve the clarity of the damaged plastic surface by removing scratches. In one embodiment, two different polishing compositions are provided, with differently configured abrasives and buffing pads or cloths employed during application of each. The first polishing abrasive may be configured to improve the clarity of the damaged plastic surface by removing scratches. The second polishing abrasive (within a second polishing composition) restores the optics of the plastic surface. Each polish may be activated by oxygen. For example, upon opening, no grit may be felt, but the grit becomes evident after about 10 seconds.

The first buffing pad or cloth is particularly suited to the task of polishing the damaged plastic surface so as to remove scratches formed therein. In a subsequent step, the second polishing composition is used to restore the optical properties of the plastic surface. The second polishing composition also includes an abrasive, although the second polishing abrasive may typically grows into a smaller grit than that of the first polishing composition to aid in better smoothing the plastic surface (e.g., smoothing any remaining relatively deep scratches and restoring the optical properties of the plastic surface). In addition, the second buffing pad or cloth may have characteristics (e.g., hardness, coarseness) that differ from those of the first buffing pad or cloth in order to better achieve improved optics and reduced optical distortion.

Whether one, two, or more polishing compositions are used, once the plastic surface has been polished, the protective coating is applied to the plastic surface after being heated to expand the plastic. Because the UV protectant solid materials are included within at least one (e.g., both) of the polishing compositions, the UV protectant material has already been worked into the substrate level of the plastic surface from the friction and heat during polishing. For example, friction resulting between the buffing pad or cloth and the plastic surface produces heat, expanding the matrix of the plastic substrate so as to allow the UV protectant material to penetrate below the exterior surface of the plastic substrate material, down into the plastic (e.g., about 30 microns in depth). Such penetration of the UV protectant material, particularly when a polymerizable material is also included within the polishing composition, provides an anchoring system to which the protective coating composition is able to better bond to. The protectant coating composition typically includes a solvent as well as a polymerizable material that forms a hard protective coating over the polished plastic surface.

With the present system, aircraft windows have been repeatedly treated as many as twelve times without reaching the minimum thickness requirement. Of course, such testing was done to determine the extent of plastic thickness removal, and such repeated treatment is generally not necessary. In addition, the present system is simple and easy to use, so that it can be done in minutes rather than hours as for other systems.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction and Definitions

Figure 1:
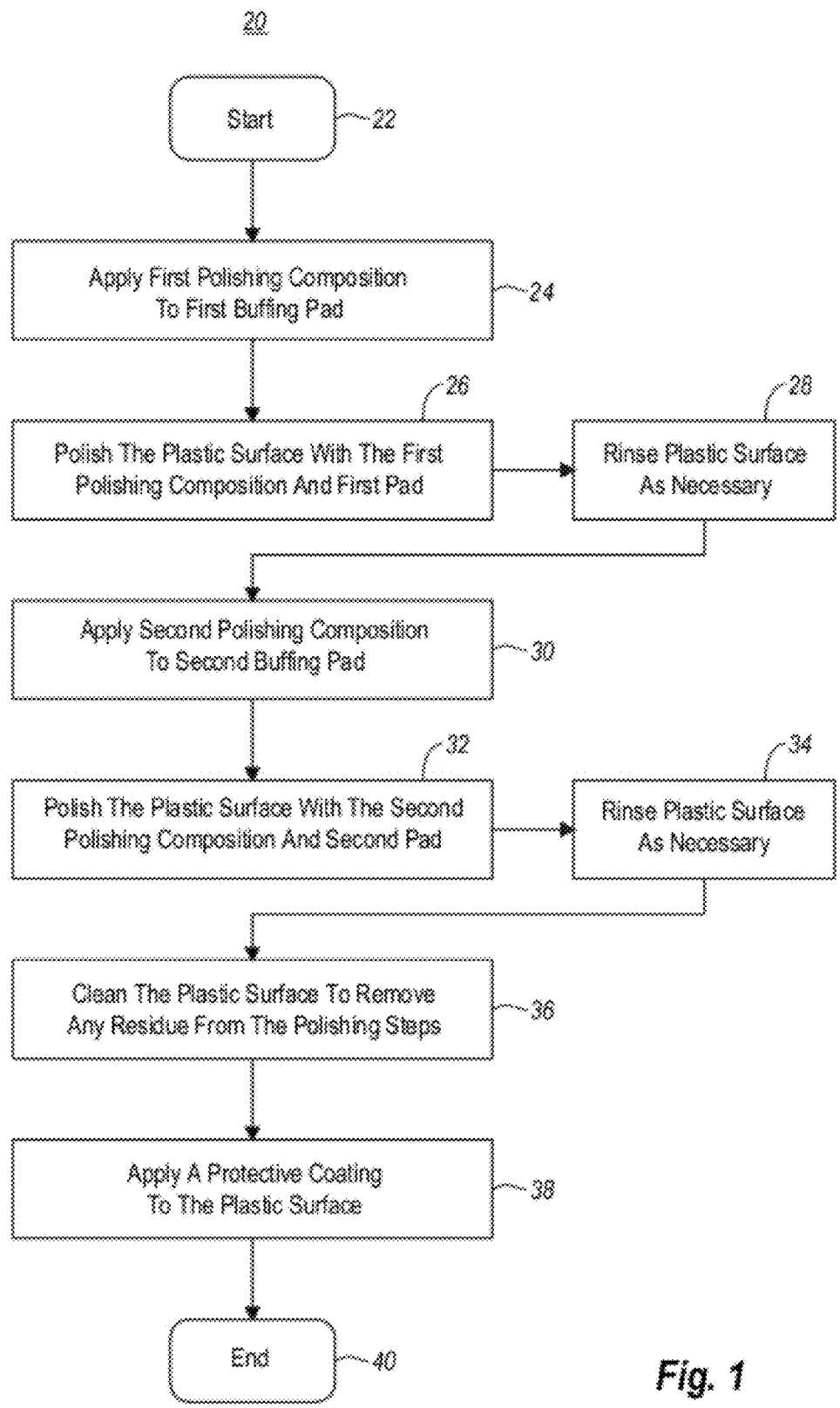
FIG. 1 is a flow-chart of a method according to an embodiment of the present invention.

The present invention is directed to kits including compositions and related methods for restoring clarity and light transmission properties to a plastic surface (e.g., a plastic aircraft window or a plastic headlight cover) that has been damaged by scratching and/or ultraviolet induced oxidation. It has been found that such imperfections or flaws in the surface of the plastic can be removed by applying to the plastic surface a series of compositions described herein. The kit of compositions may typically include at least one polishing composition for removing scratches and oxidation from a plastic surface and a protective coating composition that forms a hard protective coating layer over the restored plastic surface. Rather than simply including a UV protective material within the protective coating composition, the UV protective material (e.g., in the form of a solid powder) is included within at least one (e.g., both) of the polishing compositions so that the UV protective material becomes worked into the plastic surface during polishing. In one embodiment, the polymerizable material (e.g., in the form of a solid powder) is also included within at least one of the polishing compositions. Of course, the UV protective material and polymerizable material may also be included within the protective coating composition as well.

The inventor has found that inclusion of the UV protective material, as well as the polymerizable material, within at least one or both of the polishing compositions (e.g., within the second polishing composition), results in these solid materials being worked into the plastic surface, rather than simply deposited on the exterior surface of the plastic. For example, the UV protective material and polymerizable material may become embedded and impregnated within the plastic substrate some distance (e.g., at least about 10 microns and as much as about 50 microns) below the exterior surface of the plastic substrate. Impregnation of the UV protective material below the exterior surface of the plastic surface provides for more durable, longer-lasting UV protection to the plastic surface. Impregnation of the polymerizable material below the exterior surface of the plastic substrate provides for an anchoring system to which the protective coating composition can later bond more durably.

As used herein, the term "plastic headlight cover" refers to the molded plastic headlight covers that cover the primary lights on late model automobiles and other vehicles. These plastic headlight covers, which are typically made of polycarbonate, are ubiquitous on today's cars because they are generally more lighter and more durable than glass and plastic can readily be molded into a variety of aerodynamic shapes that fit seamlessly into the front end of the automobile.

The compositions and methods are useful for restoration of other plastic surfaces, for example plastic eyeglass lenses and plastic aircraft windows. Such aircraft windows may be those present on fixed wing aircraft or rotary wing aircraft (i.e., helicopters). Such aircraft windows are often made of polycarbonate, polycarbonate and a LEXAN laminate material, or sandwiched multi-layers of different plastics. One will appreciate, however, that there are many other plastic surfaces that can be restored according to the compositions and methods described herein. The methods, and kits disclosed herein are configured to allow a user to efficiently restore any plastic surface that has been damaged by scratching and/or ultraviolet induced oxidation.

The polishing compositions of the present invention can be applied in the same way as any polishing compound, although the results are far superior to any of the prior art compounds presently available. In one method of application for removing scratches from plastic aircraft windows, plastic headlight covers and other plastic surfaces is to apply the polishing compounds by means of conventional hand-held buffing or polishing machines, such as rotary, orbital, or other polishing machines, using an open-cell polyurethane buffing pad that may be impregnated with glass fibers. For lighter scratches, it may be preferable to manually rather than mechanically apply the compounds with the open-cell polyurethane buffing pad or with a soft cotton cloth.

It should be understood that almost any type of buffing pad or cloth may work with the compounds of the present invention including the aforementioned open-cell polyurethane material and cotton pads. Fleece wool, linen, rigid polyurethane, glass wool, and most other natural and synthetic materials may work as well. Preferably, the buffing pad or cloth should be sufficiently durable to withstand the mechanical forces of the buffing process, its stiffness should be commensurate with the difficulty of the job in question, and its component materials should not be so hard that they will scratch the plastic surface.

II. Exemplary Kits and Methods for Restoring Plastic Surfaces

In one embodiment, the present invention includes a kit for restoring optical clarity and light transmission properties to a plastic surface damaged by scratching and/or UV-induced oxidation. The kit includes one or more polishing compositions formulated to remove scratches and oxidation from the plastic surface, and a protective coating composition. A solid UV protective material is included within at least one of the polishing compositions so that the solid UV protective material is worked into the plastic surface during application of the polishing composition. In a preferred embodiment, two polishing compositions are provided, the first being configured to remove scratches, while the second is configured to smooth the plastic surface so as to reduce optical distortion. The solid UV protective materials (including the solid polymerizable material) may be included within one or both polishing compositions. In one embodiment, it is included within the second polishing composition so as to be applied immediately prior to application of the protective coating composition. Of course, in embodiments including only a single polishing composition, the solid UV protective materials are included therein.

In one embodiment, the polishing composition comprises an abrasive material having an initial grit size in a range of about 50 microns to about 400 microns, preferably in a range of about 60 microns to about 300 microns, more preferably in a range of about 70 microns to about 200 microns, and most preferably in a range of about 75 microns to about 150 microns. The polishing abrasive may be "heavy grit" or "medium grit". Heavy grit polishing abrasives have an initial grit size of about 80-200 microns, preferably about 100-150 microns. Medium grit polishing abrasives have an initial grit size of about 50-100 microns, preferably about 60-90 microns.

The polishing abrasive is advantageously dispersed within an appropriate liquid or gel carrier suitable for use in making polishing compositions. Exemplary carriers may include solvents, such as water and/or organic solvents, thickening agents, emulsifying agents, colorants, and the like.

In one embodiment, the abrasive material comprises abrasive particles that progressively break down into smaller size particles when exposed to oxygen and mechanical pressure during the polishing process. According to one embodiment, the polishing abrasive breaks down to a particle size of about 10-50 microns, preferably about 15-45 microns, more preferably about 20-40 microns, and most preferably about 25-35 microns when exposed to mechanical pressure and oxygen during the polishing process. Prior to use, the polishing compositions, as well as the protective composition, are advantageously manufactured and stored in an environment that is substantially oxygen free (e.g., under inert nitrogen).

One will of course appreciate that this phenomenon produces a polishing composition that becomes progressively finer during use. This is advantageous when one considers that typical polishing techniques involve using a series of progressively finer abrasives to remove scratches left by the previous abrasive. The polishing composition of the present invention is advantageously formulated to avoid having to use several polishing compositions to achieve a final polished surface in that the polishing composition encompasses many polishing steps in a single step by virtue of the fact that the abrasive particles become progressively finer as the polishing process continues.

In one embodiment, the kit may optionally include at least one second polishing composition formulated to further smooth the plastic surface, restore the clarity, restore optics, restore light transmission properties, and also reduce optical distortion. The second polishing composition may comprise an abrasive material having an initial grit size in a range of about 10 microns to about 60 microns, preferably in a range of about 15 microns to about 50 microns, more preferably in a range of about 20 microns to about 45 microns, and most preferably in a range of about 25 microns to about 40 microns. The second polishing abrasive may be "light grit" or "fine grit". Light grit polishing abrasives have an initial grit size of about 20-60 microns, preferably about 25-55 microns. Fine grit polishing abrasives have an initial grit size of about 10-50 microns, preferably about 15-40 microns.

The second polishing abrasive is advantageously dispersed within an appropriate liquid or gel carrier suitable for use in making polishing and/or finishing compositions. Exemplary carriers may include solvents, such as water and/or organic solvents, thickening agents, emulsifying agents, colorants, and the like.

As with the first polishing composition, the second polishing composition may comprise abrasive particles that progressively break down into smaller size particles when exposed to oxygen and mechanical pressure and oxygen during the polishing process. According to one embodiment, the second polishing abrasive breaks down to a particle size of about 1-20 microns, preferably about 2-15 microns, more preferably about 2.5-10 microns, and most preferably about 3-8 microns when exposed to mechanical pressure and oxygen during application. Prior to use, the second polishing compositions are advantageously manufactured and stored in an environment that is substantially oxygen free (e.g., under inert nitrogen).

According to one embodiment, the abrasive particles in the polishing compositions are in the form of agglomerates having an initial particle size when stored in a substantially oxygen free environment but progressively break down into smaller particles having a smaller final particle size when exposed to oxygen and mechanical pressure during the polishing process. The agglomerates advantageously break down into smaller particles having a final particle size that is less than about 75% of the initial particle size. Preferably, the agglomerates break down into particles having a final particle size that is less than about 50% of the initial particle size, more preferably less than about 33% of the initial particle size, and most preferably less than about 20% of the initial particle size.

Of course, the second polishing composition is optional, and in some embodiments, only a single polishing composition is provided and employed in the related methods. In such embodiments, a UV protective material is included within the polishing composition so that the UV protective material is worked into the plastic substrate, below the exterior surface of the substrate during polishing. In one embodiment, the UV protective material is worked into the plastic substrate to a depth of at least about 10 microns, more preferably at least about 20 microns (e.g., about 30 microns). In some embodiments, penetration of the UV protective material may be as great as about 40 microns or about 50 microns. Because the UV protective material is worked into the plastic substrate, it provides for more durable, long-lasting protection to the plastic substrate material, which effectively expands its lifespan.

Preferably, the UV protective material or materials comprise about 0.01% to about 3% of the polishing composition, calculated on a weight percent basis. More preferably, the UV protective material or materials comprise about 0.1% to about 2% of the polishing composition, calculated on a weight percent basis. Most preferably, the UV protective material or materials comprise about 0.5% to about 1% of the polishing composition, calculated on a weight percent basis.

Where polymerizable materials are included within the polishing composition, the polymerizable material comprises between about 0.5% and about 10% of the polishing composition, calculated on a weight percent basis. More preferably, the polymerizable material comprises about 1% to about 8% of the polishing composition, calculated on a weight percent basis. Most preferably, the polymerizable material comprises about 2% to about 5% of the polishing composition, calculated on a weight percent basis.

For example, when UV protective materials are incorporated into the polish composition, particularly when mechanical means are employed to apply the polish composition, some heat may be generated as a result of friction between the buffing pad or cloth and the plastic substrate. As the plastic surface is heated, the matrix of the plastic substrate material is believed to expand and open up, allowing the UV protective materials to work into the plastic substrate. Such heating is advantageously not enough to cause thermal damage or melting of the plastic substrate material, but is sufficient to aid in penetration of the UV protective material into the plastic substrate.

Included with the UV protective material within one or both polishing compositions may also be a solid polymerizable material. In one embodiment, both the UV protective material and the UV protective material are solids.

In one embodiment, the plastic substrate is friction heated to at least about 110° F., more typically at least about 140° F., and even more preferably between about 150° F. and about 180° F. It is important to limit such heating so as to prevent thermal degradation or melting of the plastic substrate material. For example, in one embodiment, the temperature is not greater than about 200° F., more preferably not more than about 180° F. In one embodiment, friction heating is to not more than about 160° F. In addition to heating by friction, an alternative embodiment may heat the plastic substrate with a heat gun or other device for delivering heated air to the plastic substrate while the polishing composition is being applied.

Where the buffing pad or cloth is mechanically manipulated, the buffing pad or cloth may be rotated between about 1500 RPM and about 3500 RPM, more preferably between about 1500 RPM and about 3000 RPM. Where two polishing compositions are provided and applied, the first buffing pad may be rotated between about 2500 RPM and about 3500 RPM, more preferably between about 2500 RPM and about 3000 RPM during application of the first polishing composition, while the second buffing pad is rotated at less than about 2000 RPM (for example, between about 1500 RPM and less than about 2000 RPM, e.g., about 1800 RPM) during application of the second polishing composition.

The kit includes at least one composition for applying a UV protective coating to the plastic surface following application of the polishing composition(s). The inventor has surprisingly found that use of the polishing compositions does not necessarily remove UV protective and other specialty coatings applied to plastic surfaces. This is surprising, particularly as the polishing composition(s) do typically include abrasives. For example, many aircraft windows (e.g., gunner's door windows of a Sikorksy H-60 Hawk or the canopies of an F-18) include proprietary coatings applied for UV protection, anti-reflection, and/or other purposes. Such plastic hardware is often very expensive, and damage or destruction of the specialty coatings would discourage use of the compositions and associated restoration methods were the coatings damaged during the restoration process. For example, a relatively small window such as a gunner's window may cost tens of thousands of dollars. A larger canopy for an aircraft may cost 40 to 60 thousand dollars.

Because the polishing compositions and methods do not damage the specialty coatings of such plastic surfaces, even such expensive, specialty coated plastic surfaces can be restored through use of the inventive compositions and methods without damage to such coatings. Of course, the compositions and methods may also be employed on non-coated plastic surfaces.

The UV protective composition includes a UV protective material dispersed within a carrier having a solvent that advantageously causes the UV protective composition to effectively become annealed or melted into the plastic surface during the buffing process. The result is a hardened UV protective coating on the plastic surface that is optically transparent and smooth. The UV protective coating may optionally include a polymerizable material that helps bond the coating to the prepared plastic surface. It is believed that because the polishing composition(s) also include the UV protective material and optionally any solid polymerizable components (e.g., acrylic powder), a stronger bond is formed between the plastic surface including embedded UV protective material and optionally polymerizable material and the protective coating. For example, the polishing composition including polymerizable material may assist in preparing the plastic surface so as to receive and form a stronger bond with the protective coating by already providing polymerizable material below the plastic substrate and embedded therein so as to creating bonding sites where the protective composition can form physical and chemical bonds to the plastic surface.

In the past, transparent protective coatings of high optical quality for UV protection have been obtained on plastic substrates by spin and dip coating, followed by baking. The UV protective compositions of the invention allow for low temperature application (e.g., at and near ambient temperature, for example with a heat gun to typically at least about 110° F., more preferably at least about 140° F.), which is achieved by the chemical dispersion of the UV protective coating within a solvent carrier, which causes the coating to anneal itself to an aircraft window, headlight lens, or other plastic surface similar to the way it is done in the original manufacturing process. It is believed that solids in the coating are made of crystalline and UV protective nano particles that coalesce into larger particles by means of a polyermizable material. This causes deposition of the UV protective particles as a relatively thick single layer (e.g., greater than about 400 nm). The transparency in the visible range is high, T≈87%, the abrasion resistance is in agreement with DIN 58-196-G10, and the hardness according to ASTM D 3363-92a is 1H. The application process allows for antiglare coatings with an adjustable gloss of 60 to 80 GU and an optical resolution greater than 8 lines/mm.

The kit may include at least one buffing pad or buffing cloth for applying the polishing composition(s) to the plastic surface. The buffing pad or buffing cloth can either be used manually or can be attached to a drill or a mechanical polisher. In one embodiment, the buffing pad or buffing cloth may be impregnated with glass fibers to enhance the action of the polishing composition(s). It is believed that the glass fibers enhance the action of the polishing composition(s) to better penetrate or "reach" into deep scratches such that deep scratches are reformed from deep, sharply angled v-shaped grooves to more shallow angled u-shaped depressions. By reforming the surface, the glass fibers allow some scratches to be restored without having to remove a layer of plastic from the plastic surface equal to the depth of the deepest scratch.

FIG. 2 depicts a flow-chart 20 of one embodiment of a method for restoring essentially any type of plastic surface that has been damaged by scratching and/or UV-induced oxidation. Flow-chart 20 starts at 22 and ends at 40. In one embodiment, the method includes applying a polishing composition to a buffing pad at 24. The polishing composition and the buffing pad are used for polishing and removing scratches and oxidative damage from a plastic surface at 26.

The buffing pad and the polishing composition may be used for polishing and removing scratches and oxidative damage from a plastic surface by attaching the buffing pad to a conventional hand-held polishing or buffing machine. Alternatively, the buffing pad can be used manually with the first polishing composition for polishing and removing scratches and oxidative damage from a plastic surface. The plastic surface can be rinsed as necessary at 28 in order to wash away dirt and/or plastic residue. The plastic surface may be dried with a clean microfiber cloth after rinsing 28.

As shown in FIG. 2, some embodiments of the method include application of a second polishing composition to a second buffing pad at 30. The optional second polishing composition is particularly configured to smooth the plastic surface and reduce optical distortion. Application of the second polishing composition with second buffing pad is referenced at 32.

In embodiments where both first and second polishing compositions are provided and applied, the buffing pads or cloths employed, as well as the conditions under with application occurs, may differ. For example, the first buffing pad or cloth may comprise a coarse "yellow" foam pad, a.k.a a "cutting pad" comprising a foam pad (e.g., an open-cell polyurethane foam) having a substantially uniform cell structure. Such uniform cell structure may be achieved by forming the buffing pad from the central portion of the open-cell polyurethane foam material. The first buffing pad may be harder or more rigid than the second buffing pad or cloth. In addition, when applying the first polishing composition, the conditions may be such so as to minimize any heating of the plastic substrate material (e.g., the buffing pad may be sufficiently wetted to prevent any substantial increase in temperature as a result of friction).

The second buffing pad may be softer than the first buffing pad (e.g., a soft "gray pad"). The conditions under which the second polishing composition is applied may allow the plastic substrate to heat up as a result of friction as described above (e.g., to between about 150° F. and about 180° F.), which better deposits the UV protective solid materials (e.g., particles) within the polishing composition(s) into the plastic substrate so as to form an anchoring system to better hold the UV protective materials in place. Where polymerizable solid materials (e.g., acrylic powder) are also included within the polishing composition(s), such materials also aid in providing an anchoring system in which the polymerizable materials become embedded below and within the plastic surface, so as to provide bonding sites for polymerizable material also included within the protective coating composition that is applied over the plastic surface after the polishing composition(s).

Similarly as described above relative to application of the first polishing composition, the second buffing pad or cloth may be attached to a conventional cordless drill or hand-held polishing or buffing machine. Alternatively, the second buffing pad or cloth can be used manually with the second polishing composition for restoring luster to the plastic surface. The plastic surface can be rinsed as necessary at 34 in order to wash away dirt and/or plastic residue. Where only a single polishing composition is employed, the composition may be that of either the first or second polishing compositions, which may typically be similar to one another, although the first polishing composition will typically include a heavy or medium grit abrasive, while the second polishing composition will typically include a light or fine grit abrasive. For example, in one embodiment including only a single polishing composition, the polishing composition is the "first polishing composition".

In one embodiment, the method includes cleaning the plastic surface to remove residues from the polishing step(s) at 36. Cleaning can be achieved with a spray of water, a damp cloth, or a clean microfiber cloth. Generally, the cleaning step should be conducted with care to avoid rescratching the plastic surface. Moreover, the cleaning step should be conducted with utmost care to remove all of the residues from the polishing step(s) prior to the application of the protective coating composition.

The method includes a step of applying a UV-protective composition to the plastic surface at 38. Application of such a new UV-protective coating prevents the plastic surface from quickly degrading as a result of exposure to the elements, while the hard protective coating provided by the polymerizable material also aids in preventing rescratching of the surface.

In preparation for application of the protective coating composition, the plastic surface may be heated, e.g., with a heat gun. In one embodiment, the plastic surface is heated to at least about 110° F., more preferably at least about 140° F. (e.g., between about 110° F. and about 160° F., more preferably between about 140° F. and about 160° F.). Heat may typically be applied for between about 2 and about 5 minutes (e.g., about 3 minutes). In addition, because the protective coating composition may have only a relatively short lifespan once exposed to oxygen, the container containing this composition is preferably not opened until the plastic substrate has been heated as described above. Once the plastic substrate is heated, the protective coating composition container is opened and immediately applied. The heated surface results in better bonding of the hard protective coating over the plastic substrate, and the polymerizable materials embedded within the substrate provide an anchoring system to provide bonding sites to which the polymerizable material within the protective coating is able to bond, resulting in a hard, durable coating formed over the plastic substrate.

In one embodiment, the ultraviolet protective composition comprises at least one solvent that allows the coating to anneal to the plastic surface, at least one polymerizable component that forms a hard, clear coating on the plastic surface, and at least one ultra-violet protective material that protects the plastic surface from future UV induced damage.

In one embodiment, the solvent in the UV protective composition is volatile. In one embodiment, it includes at least one ether compound. In an alternative embodiment, the solvent is an alcohol. When ether is the main solvent, the ether compound preferably comprises about 1% to about 20% of the UV protective composition, calculated on a weight percent basis. More preferably, the ether compound comprises about 5% to about 15% and most preferably, about 8% to about 12% by weight of the UV protective composition. When alcohol is the main solvent, the alcohol preferably comprises between about 70% to about 98% of the UV protective composition, calculated on a weight percent basis. More preferably, the alcohol comprises about 80% to about 95% of the UV protective composition. Most preferably, the alcohol comprises about 86% to about 93% of the UV protective composition by weight. Exemplary ether compounds include dipropylene glycol n-butyl ether and ethylene glycol monobutyl ether. Exemplary alcohols include isopropyl alcohol.

The solvent may also comprise a blend of alcohol and ether compounds without departing from the spirit of the invention. Example 8 below describes such an embodiment. Where the solvent includes both an alcohol and an ether, the alcohol may comprise between about 80% and about 95% of the composition by weight, more preferably between about 86% and about 93% of the composition by weight, while the ether comprises between about 5% and about 15%, more preferably between about 5% and about 10% of the composition by weight.

In one embodiment, the polymerizable compound that forms a hard, clear coating on the plastic surface includes at least one acrylic-urethane hybrid polymer dispersion. Exemplary acrylic-urethane hybrid polymer dispersions include HYBRIDUR 570 and HYBRIDUR 580, which are available from Air Products and Chemical, Inc. HYBRIDUR 570 and HYBRIDUR 580 may be used alone or in combination. Preferably, HYBRIDUR 570 comprises about 40% to about 65% of the ultraviolet protective composition, calculated on a weight percent basis. More preferably, HYBRIDUR 570 comprises about 45% to about 60% of the ultraviolet protective composition, calculated on a weight percent basis. Most preferably, HYBRIDUR 570 comprises about 50% to about 55% of the ultraviolet protective composition, calculated on a weight percent basis. Preferably, HYBRIDUR 580 comprises about 10% to about 35% of the ultraviolet protective composition, calculated on a weight percent basis. More preferably, HYBRIDUR 580 comprises about 15% to about 30% of the ultraviolet protective composition, calculated on a weight percent basis. Most preferably, HYBRIDUR 580 comprises about 20% to about 25% of the ultraviolet protective composition, calculated on a weight percent basis.

In another embodiment, the polymer or polymerizable compound that forms a hard, clear coating on the plastic surface includes at least one acrylic polymer. An exemplary acrylic polymer is ELVACITE 2776, which is available from Lucite International. Preferably, ELVACITE 2776 comprises about 0.5% to about 10% of the ultraviolet protective composition, calculated on a weight percent basis. More preferably, ELVACITE 2776 comprises about 1% to about 8% of the ultraviolet protective composition, calculated on a weight percent basis. Most preferably, ELVACITE 2776 comprises about 2% to about 5% of the ultraviolet protective composition, calculated on a weight percent basis.

Such acrylic polymer materials are typically available as a solid powder, and may thus be incorporated within one or more of the polishing compositions, along with the UV protective material, which is also available as a solid.

The ultraviolet protective coating includes at least one ultraviolet protective material to protect the plastic surface from UV-induced damage. The UV protective material is also advantageously included within one or both polishing compositions. Exemplary ultraviolet protective materials are hindered amine compounds, such as those available under the name TINUVIN (e.g., TINUVIN 384 and TINUVIN 292), which are available from Ciba. Suitable UV protective materials may include, but are not limited to, benzophenones, benzotriazoles, hydroxyphenyltriazines, and hydroxyphenylbenzotriazoles. Preferably, the ultraviolet protective material or materials comprise about 0.01% to about 1% of the ultraviolet protective coating, calculated on a weight percent basis. More preferably, the ultraviolet protective material or materials comprise about 0.05% to about 0.5% of the ultraviolet protective coating, calculated on a weight percent basis. Most preferably, the ultraviolet protective material or materials comprise about 0.1% to about 0.3% of the ultraviolet protective coating, calculated on a weight percent basis.

Additional ingredients which may be included in the ultraviolet protective composition include wetting agents to improve the uniformity of the coating, plasticizers to increase the durability of the coating, and antifoaming agents to discourage the formation of air bubbles in the ultraviolet protective coating as it is applied to the plastic surface. Exemplary wetting agents include polyether modified siloxanes, such as BYK-345, BYK-346, BYK-347, BYK-348, BYK-349, which are available from BYK Chemie, Inc, and sodium dioctyl sulfosuccinate, which is available from Cytec. Exemplary plasticizers include derivatives of citric acid, such as triethyl citrate, acetyl triethyl citrate, tributyl citrate, acetyl tributyl citrate, and tri-(2-ethylhexyl)-citrate. Exemplary defoamers include the SURFYNOL line of chemicals available from Air Products and Chemicals, Inc.

EXAMPLES OF SPECIFIC FORMULASs

Below are specific examples of compositions and methods which have been created according to the present invention.

Example 1

A medium abrasive polishing composition including a UV protective material in accordance with the present invention is prepared with the following formulation:

|  | % W/W |
|---|---|
| Solid abrasive material | 30.0 |
| Propylene Glycol | 5.0 |
| Carboxymethyl Cellulose | 1.0 |
| Ethylene Oxide/Propylene Oxide Block Copolymer | 2.5 |
| Fragrance 98164 | 0.2 |
| 1-(3-chloroallyl)-3,5,7-Triaza-1-azonia adamantane chloride | 0.2 |
| TINUVIN 384 | 0.5 |
| TINUVIN 292 | 0.3 |

Sufficient deionized water is added to bring the total volume to 100 percent (w/w).

The composition is prepared, packaged, and stored in a substantially oxygen free environment. For example, the dry material is added to a mixing apparatus. Subsequently, the dry materials and the mixer are exposed to a vacuum such that essentially all oxygen is evacuated from the dry ingredients. An inert gas such as nitrogen is added back to the mixing apparatus, the liquid ingredients are added, and the composition is mixed. The composition is subsequently packaged in a substantially oxygen free environment.

It is believed that preparing and packaging the composition under oxygen free conditions allows the abrasive particles to agglomerate into larger particles. It is believed that this aggregation occurs in a substantially oxygen free environment because the lack of oxygen may alter the surface charge properties of the abrasive particles. A person having ordinary skill in the art will appreciate that this aggregation is progressively reversed when the abrasive particles are exposed to oxygen and mechanical pressure during the polishing process.

This formulation exhibits a creamy viscous lotion consistency, and is cream in color. In this and other examples coconut fragrance may be added for fragrance purposes only, and it should be understood that fragrance could be omitted or substituted without altering the efficiency of the polishing composition. This formulation has a wide variety of uses for removing scratches from plastic surfaces.

The solid abrasive material may include one or more of kaolinitic quartz, silicon dioxide, or calcined alumina. The particle size of the polishing materials ranges from about 50 microns to about 400 microns.

Example 2

A light abrasive second polishing composition including a UV protective material in accordance with the present invention is prepared with the following formulation:

|  | % W/W |
| --- | --- |
| Solid abrasive material | 30.0 |
| Propylene Glycol | 5.0 |
| Carboxymethyl Cellulose | 1.0 |
| Ethylene Oxide/Propylene Oxide Block Copolymer | 2.5 |
| Fragrance 98164 | 0.2 |
| 1-(3-chloroallyl)-3,5,7-Triaza-1-azonia adamantane chloride | 0.2 |
| TINUVIN 384 | 0.5 |
| TINUVIN 292 | 0.3 |

Sufficient deionized water was added to bring the total volume to 100 percent (w/w), which yields a viscous, creamy fluid with a lotion-like consistency. In this and other examples coconut fragrance is added for fragrance purposes only, and it should be understood that fragrance could be omitted or substituted without altering the efficiency of the polishing composition.

The composition is prepared, packaged, and stored in a substantially oxygen free environment. For example, the dry materials are added to a mixing apparatus. Subsequently, the dry materials and the mixer are exposed to a vacuum such that essentially all oxygen is evacuated from the dry ingredients. An inert gas such as nitrogen is added back to the mixing apparatus, the liquid ingredients are added, and the composition is mixed. The composition is subsequently packaged in a substantially oxygen free environment.

It is believed that preparing and packaging the composition under oxygen free conditions allows the abrasive particles to aggregate into larger particles. It is believed that this aggregation occurs in a substantially oxygen free environment because the lack of oxygen alters the surface charge properties of the abrasive particles. A person having ordinary skill in the art will appreciate that this aggregation is progressively reversed when the abrasive particles are exposed to oxygen and mechanical pressure during the polishing process. This light abrasive formulation may be used as a second polishing composition for treatment for plastics first treated with the polishing composition of Example 1.

In this example, the solid polishing material includes a blend of kaolinitic quartz, silicon dioxide, and calcined alumina. The particle size of the polishing materials ranges from about 1 micron to about 50 microns.

Example 3

A heavy abrasive polishing composition including a UV protective material in accordance with the present invention is prepared with the following formulation:

| Ingredient | Trade Name/Supplier | % W/W |
| --- | --- | --- |
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 18.0 |
| Fused Silica (8.8 microns average) | Siltex 44/Kaopolite Co. | 3.0 |
| Boehmite Alumina (60 microns average) | Catapal D/Sasol (formerly Vista) | 2.0 |
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| TINUVIN 384 |  | 0.5 |
| TINUVIN 292 |  | 0.3 |
| Deionized Water |  | q.s. to 100 |

This heavy formulation is useful for quick removal of scratches from most plastic surfaces, although it would not likely be used with compact discs, eyeglass lenses or the like. A medium formulation such as set forth in Example 1 and/or a light formulation as set forth in Example 2 might be better used for such purposes. In addition, the Medium formulation of Example 1 or the light formulation of Example 2 may be used to complete the repair after an initial treatment with this heavy formulation.

Example 4

A medium abrasive polishing composition including a UV protective material in accordance with the present invention is prepared with the following formulation:

| Ingredient | Trade Name/Supplier | % W/W |
| --- | --- | --- |
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 8.0 |
| Celite Diatomaceous Silica | Super Floss or Snow Floss/Celite | 7.0 |
| Boehmite Alumina | Catapal D/Sasol (formerly Vista) | 8.0 |
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| TINUVIN 384 |  | 0.5 |
| TINUVIN 292 |  | 0.3 |
| Deionized water |  | q.s. to 100 |

This formulation is suitable for many uses, such as those described in Example 1. The boehmite aluminum has the advantage of being relatively soft. It will break into smaller fragments during use, assisting in repair of the increasingly small scratches which exist during the course of repair.

Example 5

A fine abrasive lustering composition including a UV protective material in accordance with the present invention is prepared with the following formulation:

| Ingredient | Trade Name/Supplier | % W/W |
|---|---|---|
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 23.0 |
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| TINUVIN 384 | | 0.5 |
| TINUVIN 292 | | 0.3 |
| Deionized water | | q.s. to 100 |

This fine abrasive formulation is similar to Example 2 but has a finer abrasive. As with Example 2, this second polishing composition has a variety of uses, but is particularly preferred as a final treatment for plastic surfaces first treated with a first polishing composition such as that of Example 1 or Example 3.

Example 6

A light abrasive polishing composition including a UV protective material is prepared with the following formulation:

| Ingredient | Trade Name/Supplier | % W/W |
|---|---|---|
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 11.5 |
| Zirconia (2-4 microns average) | | 11.5 |
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| TINUVIN 384 | | 0.5 |
| TINUVIN 292 | | 0.3 |
| Deionized water | | q.s. to 100 |

This example includes zirconia (zirconium oxide) as an abrasive. This is a hard material that should be used with care. Any of examples 1-6 may be formulated without the UV protective material and included within a kit of compositions where another included composition includes the UV protective material. For example, any of Examples 1, 3, or 4 (as a first polishing composition) may be provided without a UV protective material, and paired in a kit with any of Examples 2, 5, or 6 (as a second polishing composition). Alternatively, the UV protective material may included within both polishing compositions of any such kit.

Example 7

A light abrasive polishing composition including a UV protective material and a polymerizable component was prepared with the following formulation:

| | % W/W |
|---|---|
| Aluminum Silicate | 20 |
| Propylene Glycol | 5-10 |
| Secondary Alcohol Ethoxylate | 2-3 |
| Boehmite Alumina | 2 |
| Xanthan Gum | 0.1-0.5 |
| Sodium Carboxymethyl Cellulose | 0.3-0.6 |
| Phenoxyethanol | 0.5-1 |
| Diazolidinyl Urea | <0.5 |
| Methylparaben | <0.2 |
| Propylparaben | <0.1 |
| Acrylic Powder | 2-3 |
| Sodium dioctyl Sulfosuccinate 75% | <0.1 |
| Triethyl Citrate | 0.1-0.3 |
| TINUVIN 384 | 0.2-0.5 |
| TINUVIN 292 | 0.1-0.3 |

Sufficient deionized water was added to bring the total volume to 100 percent (w/w). The composition was prepared, packaged, and stored in a substantially oxygen free environment. For example, the dry material was added to a mixing apparatus. Subsequently, the dry materials and the mixer were exposed to a vacuum such that essentially all oxygen is evacuated from the dry ingredients. An inert gas such as nitrogen was added back to the mixing apparatus, the liquid ingredients were added, and the composition was mixed. The composition was subsequently packaged in a substantially oxygen free environment.

This formulation may be preferred when only a single polishing composition is used, in conjunction with a protective coating composition applied thereafter. It provides a light abrasive action with both aluminum silicate and boehmite alumina. In addition, it also includes a polymerizable material (e.g., acrylic powder), which becomes worked into the plastic substrate along with the UV protective material, providing an anchor to which the later applied protective coating composition can better bond to. This formulation takes the solid materials from the UV protective coating composition of Example 10 and includes those materials within a polishing composition. Some non-solid materials may also be taken from the formulation of Example 10 (e.g., sodium dioctyl sufosuccinate 75%, triethyl citrate) so long as they are compatible with the other components of the polishing composition. For example, the solvent constituents of Example 10 (i.e., the isopropyl alcohol and the ethylene glycol monobutyl ether) are not included within the polishing composition, but only within the UV protective coating composition that is applied separately.

Figure 2A:
FIG. 2A is a photograph showing an aircraft window before restoration.
Figure 2B:
FIG. 2B is a photograph showing the aircraft window of FIG. 2A after restoration.
Figure 3A:
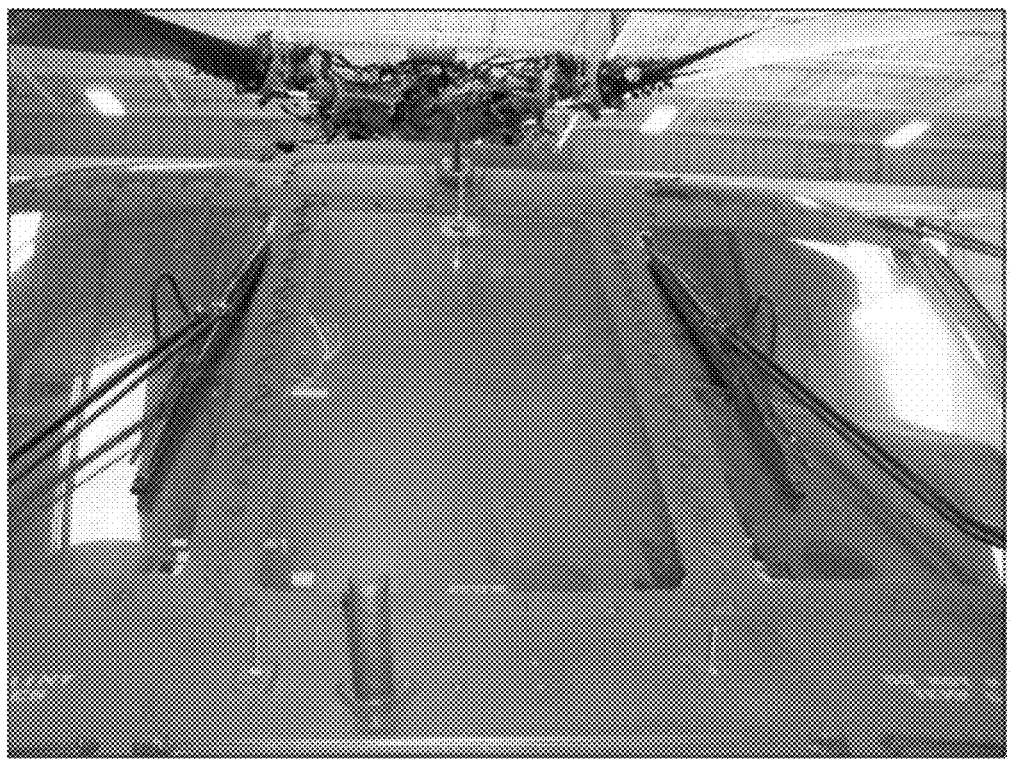
FIG. 3A is a photograph of another series of aircraft windows before restoration.
Figure 3B:
FIG. 3B is a photograph showing the aircraft windows of FIG. 3A after restoration.
Figure 4:
FIG. 4 is a photograph showing another aircraft window including a central portion that has been restored, while the portions on either side have not been restored.

This formulation was used as a single polishing composition in restoration of the aircraft windows seen in FIGS. 2A-4, in conjunction with the UV protective coating composition of Example 10. FIGS. 2A and 2B show before and after photographs, respectively, of the side windows of the Sikorsky H60 Hawk. FIGS. 3A and 3B show before and after photographs, respectively of the front windows of the same helicopter, while FIG. 4 shows the gunner's window with a central portion after restoration, and both side portions before treatment.

Example 8

Abrasive polishing compositions including a UV protective material and a polymerizable component are prepared according to any of Examples 1-6 modified with the addition of 2-3 weight percent acrylic powder. The UV protective materials and polymerizable materials, which are solids, become worked into the plastic substrate, providing an anchor to which the later applied protective coating composition (e.g., any of Examples 9-11 below) can better bond to.

Example 9

An ultraviolet protective coating was prepared in accordance with the present invention with the following formulation:

| Ingredient description | Trade name | % W/W |
|---|---|---|
| Dipropylene Glycol n-Butyl Ether | Arcosolve DPnB | 9.8 |
| Polyether modified polydimethylsiloxane | BYK-346 | 0.5 |
| Light stabilizer | Tinuvin 384 | 0.7 |
| Light stabilizer | Tinuvin 292 | 0.4 |
| Urethane Hybrid Polymer | Hybridur 570 Polymer Dispersion | 51.5 |
| Urethane Hybrid Polymer | Hybridur 580 Polymer Dispersion | 22.1 |
| Defoamer | Surfynol DF-58 | 0.2 |
| Water, DI | Water, DI | 14.9 |
| | TOTAL | 100.0 |

The coating composition appeared as a uniform flowable liquid. This light ultraviolet protective coating has a variety of uses, but is particularly preferred as a coating for restoring a UV protective layer to plastic surfaces treated with one or more of the compositions of Examples 1-8.

Example 10

An ultraviolet protective coating was prepared in accordance with the present invention with the following formulation:

| Ingredient | Trade Name/Supplier | % w/w |
|---|---|---|
| Isopropyl alcohol | Any suitable vendor | 88.85 |
| Acrylic polymer | Elvacite 2776/Lucite International | 3.0 |
| Sodium dioctyl sulfosuccinate, 75% | Aerosol OT-75/Cytec | 0.05 |
| Triethyl citrate | Citroflex 2/Morflex | 0.3 |
| Ethylene Glycol monobutyl ether | Dowanol EB/Dow | 7.0 |
| Light stabilizer | Tinuvin 384/Ciba | 0.5 |
| Light stabilizer | Tinuvin 292/Ciba | 0.3 |
| | TOTAL | 100.0 |

The coating composition appeared as a uniform flowable liquid and dried to a hard, clear surface in approximately 30 minutes.

Example 11

An ultraviolet protective coating was prepared in accordance with the present invention with the following formulation:

| Ingredient | Trade Name/Supplier | % w/w |
|---|---|---|
| Isopropyl alcohol | Any suitable vendor | 90.95 |
| Acrylic polymer | Elvacite 2776/Lucite International | 3.0 |
| Sodium dioctyl sulfosuccinate, 75% | Aerosol OT-75/Cytec | 0.05 |
| Dipropylene Glycol n-Butyl Ether | Arcosolve DPnB/Arco | 5.0 |
| Light stabilizer | Tinuvin 384/Ciba | 0.5 |
| Light stabilizer | Tinuvin 292/Ciba | 0.3 |
| Antifoam | Surfynol DF-58/Air Products | 0.2 |
| | TOTAL | 100.0 |

The coating composition appeared as a uniform flowable liquid and dried to a hard, clear surface in approximately 30 minutes.

As used in this specification and the appended claims, the singular forms "a", "an" and "the" include plural referents unless the context clearly dictates otherwise. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A kit for restoring optical clarity and light transmission properties to a plastic surface damaged by scratching and/or UV-induced oxidation, comprising:
   at least one polishing composition having a polishing abrasive configured to remove scratches and/or oxidative damage from a plastic surface so as to improve optical clarity of the plastic surface, the polishing abrasive being dispersed within a liquid or gel carrier, wherein the at least one polishing composition further includes a non-abrasive UV protective material that is dispersed within the at least one polishing composition in addition to the polishing abrasive so that the UV protective material is configured to be worked into a plastic surface by the polishing abrasive during application of the polishing composition to a plastic surface; and
   a protective coating composition for applying a protective coating to a plastic surface previously treated with the polishing composition so as to work the UV protective material therein, the protective coating composition comprising a polymerizable material and at least one solvent.

2. A kit as recited in claim 1, wherein the protective coating composition further comprises a UV protective material.

3. A kit as recited in claim 1, wherein the at least one polishing composition comprises:
   a first polishing composition including a first polishing abrasive dispersed within a first liquid or gel carrier; and
   a second polishing composition including a second polishing abrasive having a smaller grit size than the first polishing abrasive dispersed within a second liquid or gel carrier.

4. A kit as recited in claim 3, wherein:
   the first polishing composition includes a first polishing abrasive configured to remove scratches from a plastic surface so as to improve clarity of the plastic surface; and
   the second polishing composition having a second polishing abrasive configured to smooth a plastic surface so as to reduce optical distortion;
   wherein the UV protective material is dispersed within at least one of the first or second polishing compositions.

5. A kit as recited in claim 4, further comprising:
a first buffing pad or buffing cloth for applying the first polishing composition to a plastic surface; and
a second buffing pad or buffing cloth for applying the second polishing composition to a plastic surface, wherein the first buffing pad or buffing cloth is harder than the second buffing pad or buffing cloth.

6. A kit as recited in claim 5, wherein the UV protective material is included within both the first and the second polishing compositions.

7. A kit as recited in claim 5, wherein the first buffing pad or buffing cloth comprises a foam pad having a substantially uniform cell structure that is coarser than that of the second buffing pad or buffing cloth.

8. A kit as recited in claim 1, wherein the at least one polishing composition and the protective coating composition are each separately packaged from one another in a substantially oxygen free environment.

9. A kit as recited in claim 8, wherein the at least one polishing composition and the protective coating composition are each separately packaged in a foil package.

10. A kit as recited in claim 1, wherein the at least one polishing composition further comprises a polymerizable material also configured to be worked into the plastic surface during polishing so as to provide an anchoring system to which the protective coating composition is able to bond.

11. A kit as recited in claim 1, wherein the solvent of the protective coating composition is volatile.

12. A method for restoring optical clarity and light transmission properties to a plastic surface damaged by scratching and/or UV-induced oxidation, comprising:
polishing a plastic surface with at least one polishing composition including a polishing abrasive dispersed within a liquid or gel carrier, the at least one polishing composition being applied to the plastic surface using a buffing pad or buffing cloth to improve clarity by removing scratches and/or oxidative damage from the plastic surface;
wherein the at least one polishing composition further includes a non-abrasive UV protective material in addition to the polishing abrasive that is worked into the plastic surface by the polishing abrasive during application of the at least one polishing composition including the UV protective material; and
applying a protective coating to the plastic surface following polishing with the at least one polishing composition, wherein the protective coating comprises at least one solvent and at least one polymerizable material that polymerizes after application to form a hard protective coating on the plastic surface that includes the UV protective material worked therein.

13. A method as recited in claim 12, wherein the polishing a plastic surface with the at least one polishing composition comprises:
polishing a plastic surface with a first polishing composition including a polishing abrasive, the composition being applied to the plastic surface using a first buffing pad or buffing cloth to improve clarity by removing scratches and/or oxidative damage from the plastic surface; and
polishing the plastic surface with a second polishing composition including a polishing abrasive, the second polishing composition being applied to the plastic surface using a second buffing pad or buffing cloth, at least one of the second polishing abrasive or the second buffing pad or buffing cloth having characteristics that differ from those of the first polishing abrasive or the first buffing pad or buffing cloth respectively, so that application of the second polishing composition to the plastic surface reduces optical distortion by smoothing the plastic surface.

14. A method as recited in claim 13, wherein the first buffing pad or buffing cloth is harder and/or coarser than the second buffing pad or buffing cloth.

15. A method as recited in claim 14, wherein the first buffing pad or buffing cloth comprises a foam pad having a substantially uniform cell structure that is coarser than that of the second buffing pad or buffing cloth.

16. A method as recited in claim 15, wherein the UV protective material is included within at least the second polishing composition.

17. A method as recited in claim 16, wherein polishing with the second buffing pad or buffing cloth heats the plastic surface to a temperature of at least about 110° F. as a result of friction so as to deposit the UV protective material into the plastic surface during application of the second polishing composition.

18. A method as recited in claim 17, wherein polishing with the second buffing pad or buffing cloth heats the plastic surface to a temperature between about 150° F. and about 180° F. so as to deposit the UV protective material into the plastic surface during application of the second polishing composition.

19. A method as recited in claim 17, wherein the first buffing pad is mechanically rotated between about 2500 RPM and about 3500 RPM during application of the first polishing composition.

20. A method as recited in claim 19, wherein the second buffing pad is mechanically rotated at less than about 2000 RPM during application of the second polishing composition.

21. A method as recited in claim 20, wherein the protective coating composition is applied by hand.

22. A method as recited in claim 21, wherein the plastic is further heated to at least about 110° F. immediately prior to application of the protective coating to expand the plastic so as to promote deeper penetration of the protective coating composition into the plastic surface.

23. A method as recited in claim 22, wherein the plastic is heated to between about 140° F. and about 160° F. immediately prior to application of the protective coating to expand the plastic so as to promote deeper penetration of the protective coating composition into the plastic surface.

24. A method as recited in claim 12, wherein application of the at least one polishing composition heats the plastic surface to a temperature between about 150° F. and about 180° F. so as to deposit the UV protective material into the plastic surface during application of the at least one polishing composition including the UV protective material.

25. A kit for restoring optical clarity and light transmission properties to a plastic surface damaged by scratching and/or UV-induced oxidation, comprising:
a first polishing composition comprising:
a first liquid or gel carrier;
a first polishing abrasive dispersed within the first liquid or gel carrier, the first polishing abrasive being configured to remove scratches from a plastic surface so as to improve clarity of the plastic surface;
a non-abrasive UV protective organic compound dispersed within the first liquid or gel carrier that is configured to be worked into a plastic surface during application of the first polishing composition to a plastic surface;
a polymerizable material dispersed within the first liquid or gel carrier that is configured to be worked into a plastic surface during application of the first polishing composition to a plastic surface; and a second polishing composition comprising:

a second liquid or gel carrier;

a second polishing abrasive of a smaller grit size than the first polishing abrasive and that is dispersed within the second liquid or gel carrier, the second polishing abrasive being configured to smooth a plastic surface so as to reduce optical distortion;

a non-abrasive UV protective material dispersed within the second liquid or gel carrier of the second polishing composition that is configured to be worked into a plastic surface during application of the second polishing composition to a plastic surface; and a polymerizable material dispersed within the second liquid or gel carrier of the second polishing composition that is configured to be worked into a plastic surface during application of the second polishing composition to a plastic surface; and a non-abrasive protective coating composition for applying a protective coating to a plastic surface previously treated with the polishing compositions so as to work the UV protective material and polymerizable material into the plastic surface, the protective coating composition comprising a polymerizable material, a UV protective material, and at least one solvent.

* * * * *